June 6, 1950          E. L. HARDER          2,510,631

TRANSIENT COMPENSATION OF POTENTIAL-DEVICE BURDENS

Filed Aug. 6, 1949

WITNESSES:
Edward Michaels
[signature]

INVENTOR
Edwin L. Harder.
BY [signature]
ATTORNEY

Patented June 6, 1950

2,510,631

UNITED STATES PATENT OFFICE 2,510,631

TRANSIENT COMPENSATION OF
POTENTIAL-DEVICE BURDENS

Edwin L. Harder, Pittsburgh, Pa., assignor to Westinghouse Electric Corporation, East Pittsburgh, Pa., a corporation of Pennsylvania Application August 6, 1949, Serial No. 108,983

1 Claim. (Cl. 171—97)

My invention relates to potential-devices such as are shown in the Peters Patent 1,819,260, granted August 18, 1931. These potential-devices are adapted to be connected to either an intermediate-voltage tap of a string of coupling capacitors or an intermediate tap of a bushing of a circuit-breaker or transformer. In either event, the potential-device is adapted for use with a high-voltage alternating-current line; the tapped capacitor or the tapped bushing reduces the line-voltage to a relatively small value, such as 4,000 volts between the tapped point and ground, and the potential-device includes a step-down transformer and tuning means, for reducing this tapped voltage to a still lower value, such as 115 volts.

It has long been known that, under transient conditions, a capacitor potential-device, such as that which has just been described, does not accurately reproduce the primary line-voltage. A paper by Woods, Langguth and myself, has reported certain studies made on this subject, in Electrical Engineering, vol. 59, February 1940. An AIEE committee is at present studying the same problem. My associates and myself have also just completed a study of the transient performance of potential-devices on a new electric analog computer. The reason for the inaccuracy of the capacitor potential-device under transient conditions will be hereinafter explained, with reference to the accompanying drawing—suffice it to say, at this point, that the inaccuracy is well known and well established.

Capacitor potential-devices are used to provide a supply-voltage for protective relays and for various instruments. An analysis of the problem has shown that, of all the relays and instruments to which potential is supplied by a capacitor potential-device, the only element which produces a really serious erroneous operation, as a result of the inaccuracy of the potential-devices during transient conditions, is the high-speed directional relay which is used as a part of the protective relaying equipment. The wrong operation of the high-speed directional relay can result in tripping out the wrong transmission-line (as well as the right one), upon the occurrence of a nearbly fault, and this erroneous tripping may result in a complete loss of power to a highly important load.

The directional element, however, constitutes but a small part of the total burden on most potential-devices. For example, the directional element of a common type of high-speed relay which is manufactured by the Westinghouse Electric Corporation has a burden of approximately 4 watts. On the other hand, most potential-devices for use with coupling-capacitors are rated at 150 watts burden, while potential-devices for use with bushings are rated at 100 watts, for the higher-voltage bushings.

The object of my present invention is to provide a compensating-means whereby a small burden will receive a substantially correct voltage from a capacitor potential-device during transient conditions, even though the potential-device is at the same time supplying a heavy burden, approaching its rating, but subject to inaccuracies during transient conditions.

The nature and operation of my invention will be hereinafter described and claimed, with reference to the accompanying drawing, wherein Figure 1 shows the capacitor potential-device as it is ordinarily constructed, without the addition of my present invention, this showing being needed for the purpose of explaining the invention;

Figure 1:
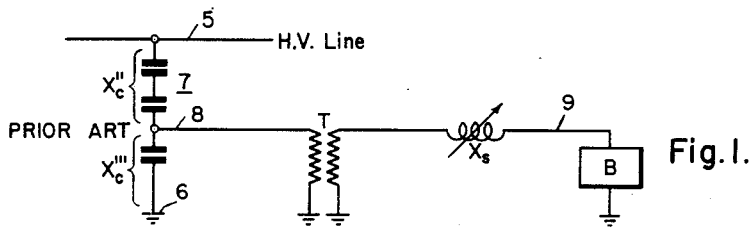

Fig. 1 shows the conventional capacitor potential-device. Connected between high-voltage line 5 and the ground 6 is a capacitance-divider 7 which may be either a coupling capacitor or a condenser-bushing. The capacitance-divider 7 is shown as having a tapped point 8, which usually provides about 4,000 volts above ground. The reactance of the divider between the tapped point and the line is indicated at $X''_c$, and the reactance of the divider between the tapped point and ground is indicated at $X'''_c$.

The tap 8 of the capacitance-divider 7 is used to energize the primary input-circuit of a step-down potential-transformer T. The step-down transformer T has a secondary output-circuit 9 which is connected to the burden B. The secondary output-circuit 9 necessarily contains some sort of means for adjusting the equivalent leakage-reactance of the step-down transformer T, so as to, in effect, make this equivalent leakage-reactance substantially equal to the equivalent capacitive reactance of the source or divider, as will be more clearly understood from the equivalent diagram in Fig. 2. In Fig. 1, this leakage-reactance adjusting-means is shown as a variable or tunable inductance which is represented by its reactance $X_s$, but it is to be understood that this representation is intended to indicate either a variable reactor, separate from the transformer T and serially connected within the secondary output-circuit 9 thereof, or the variable-reactance part of the leakage-reactance of a variable-leakage-reactance transformer T. In this way, the equivalent capacitive reactance $X_c$ of the source is tuned out, so that the regulation of the secondary output-circuit 9 will be small, and the voltage of this circuit will be in phase with the voltage of the high-voltage line 5 during steady operating-conditions.

Figure 2:
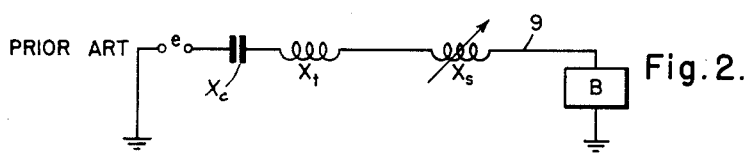
Fig. 2 is an equivalent-circuit diagram of the apparatus shown in Fig. 1.

Fig. 2 shows an equivalent diagram of the apparatus shown in Fig. 1, in which the capacitance-divider or source is replaced by its equivalent internal voltage $e$ and its equivalent internal reactance $X_c$, according to Thevenin's theorem. The voltage $e$ in Fig. 2 is that voltage which would appear at the tap-point 8 in Fig. 1, with that part of the circuit to the right of 8 disconnected. The capacitive reactance $X_c$ in Fig. 2 is that reactance would be measured at the terminal 8 in Fig. 1, looking toward the left, or toward the capacitance-divider, with the high-voltage line 5 shorted to ground. In other words, the equivalent reactance $X_c$ is the equivalent of two parallel connected reactances $X''_c$ and $X'''_c$. In Fig. 2, the step-down transformer T of Fig. 1 is represented by its leakage reactance $X_t$.

It is apparent that this equivalent circuit, as shown in Fig. 2, will have a minimum regulation if the total inductive reactance $(X_t+X_s)$, which I will refer to as the equivalent leakage-reactance of the step-down transformer, is made equal to the capacitive reactance $X_c$. It is also apparent that this adjustment will make the burden-voltage, that is, the voltage delivered by the secondary output-circuit 9 to the burden B, in phase with the voltage $e$, which is in phase with the voltage of the high-voltage line 5 in Fig. 1. It is still further apparent that, except for the resistance-drop, which is not shown in Fig. 2, the burden-voltage will not only be in phase with the equivalent source-voltage $e$, but it will also be equal thereto. In fact, the source-voltage $e$ is simply the high-voltage line-potential, multiplied by a potentiometer-constant.

If the high-voltage line 5 of Fig. 1 is suddenly short-circuited or made to have a voltage equal to zero, as by reason of a negligible-resistance ground-fault very close to the point of connection of the capacitance-divider 7, the equivalent source-voltage $e$ suddenly becomes zero. However, the burden-voltage does not suddenly go to zero, but decays in accordance with the oscillation-characteristic of the circuit. For example, if the burden B were a series R–L impedance, then the complete circuit of Fig. 2 would be an R–L–C series-circuit, which would be oscillatory if $R^2$ were less than $4L/C$. The frequency of free oscillation of this circuit is $$f=\frac{1}{4\pi L}\sqrt{\frac{4L}{C}-R^2}$$

If this oscillation-frequency $f$ differs from the system-frequency, which would usually be 60 cycles, the error-voltage, due to the oscillation, may get into the wrong phase-position before it decays to an inconsequential value. This is the reason why the output-voltage of the capacitance potential-device does not accurately correspond to the phase of the line-voltage during transient conditions, thus causing the erroneous relaying-results previously referred to.

If the burden B on the capacitance potential-device were zero, the output-voltage of the potential-device would be correct, even under transient conditions, because then the magnitude of the free oscillation would be zero, and we would then have simply a capacitance-divider. If the total burden B were very low, compared to the rating of the potential-device, a similar result would be realized, practically, because the magnitude of the oscillation, or the transient-voltage term, decreases directly with the burden-magnitude. It has been demonstrated, experimentally and theoretically, that correct operation would be secured, for example, if the high-speed directional element of a protective relaying system were the only burden on a capacitor potential-device.

However, a capacitor potential-device is used, in the first place, to save the cost of potential-transformers, and hence, in actual commercial operation, it must supply all of the potential required by all of the relays and instruments, if its low-cost advantages are to be realized.

Figure 3:
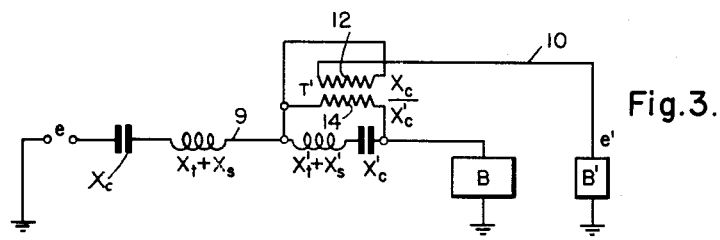
Fig. 3 is a diagram similar to Fig. 2, with an illustrative form of embodiment of my present invention incorporated therein.

Fig. 3 shows a means, in accordance with my present invention, in which a light burden, or a small burden B', receives a substantially correct voltage, namely substantially the same voltage which it would receive if the heavy burden, or the main burden, B, were not connected, while at the same time permitting the ordinary kind of potential-device voltage-supply to the heavy burden B, which is the part of the total burden which is non-critical to transient conditions.

I obtain this effect by providing a branch-circuit 10 for the phase-sensitive light burden B', and by introducing, in this branch-circuit, a compensator-voltage which neutralizes the voltage-drop occasioned by the main burden B. Thus, as shown in Fig. 3, I connect, in series with the secondary output-circuit 9, an auxiliary capacitance which is represented by its reactance $X'_c$, and an auxiliary inductance which is represented by its reactance $(X'_t+X'_s)$, thus providing a main-burden circuit in which the main burden B draws its current through said auxiliary capacitance and said auxiliary inductance. The branch-circuit 10, for the small phase-sensitive burden B', is shunted off from the secondary output-circuit 9 of the potential-device, and this branch-circuit serially includes the secondary winding 12 of a compensating transformer T', said compensating transformer having a primary winding 14 which is connected across both the auxiliary capacitance, represented by $X'_c$, and the auxiliary inductance, represented by $$(X'_t+X'_s)$$

Physically, if the variable part $X_s$, of the equivalent leakage-reactance $(X_t+X_s)$ is separate from the step-down transformer T, as shown in Fig. 1, the auxiliary inductance $(X'_t+X'_s)$ may be a part of a tapped inductance $$(X_s+X'_t+X'_s)$$

In this way, whatever error is occasioned by the main burden B drawing its current through the equivalent capacitive reactance $X_c$ and the equivalent inductive reactance or equivalent leakage-reactance $(X_t + X_s)$ is removed, in the shunt-circuit 10, by introducing an equal and opposite voltage in the secondary winding 12 of the compensating transformer T'. To this end, it is necessary that the ratio between the reactance $(X'_t + X'_s)$ of the auxiliary inductance and the equivalent leakage-reactance $(X_t + X_s)$ of the step-down transformer T shall be substantially the same as the ratio between the reactance $X'_c$ of the auxiliary capacitance and the equivalent capacitive reactance $X_c$ of the source. Mathematically expressed, this relation is, $$\frac{X'_c}{X_c} = \frac{X'_t + X'_s}{X_t + X_s}$$

It is also necessary that the voltage-ratio N of the compensating transformer T' shall be substantially the same as the ratio between the equivalent capacitive reactance $X_c$ of the source and the reactance $X'_c$ of the auxiliary capacitance. Expressed mathematically, this relation is, $$N = \frac{X_c}{X'_c}$$

The operation of my device, as shown in Fig. 3, will best be understood by analyzing the same in accordance with Thevenin's theorem, which shows that the performance of the branch-circuit 10, having the small burden B', is identical with the performance of a device in which the main burden B is disconnected, and in which the effective series elements, between the source-voltage $e$ and the small burden B', are $X_c$, $(X_t + X_s)$, $N^2 X'_c$, and $N^2 (X'_t + X'_s)$.

To give a concrete example, which is only by way of illustration, we may assume that the reactance $X'_c$ of the auxiliary capacitance is equal to 0.5 times the equivalent source-reactance $X_c$. Then $N = 2$, $N^2 = 4$, and $X_c + N^2 X'_c = 3X_c$. Hence, the transient performance of a 4-watt burden B' on a 150-watt device, carrying a 146-watt burden B, would be the same as the performance of a 4-watt burden alone, on a device of 3 times the equivalent impedance values, that is, $3X_c$ and $3(X_t + X_s)$. It can be shown that this is the same as the transient performance of a 12-watt burden on the device with the original equivalent-impedance values, that is $X_c$ and $(X_t + X_s)$. The transient performance of either a 150-watt potential-device or a 100-watt potential-device, with a 12 watt burden, is quite satisfactory.

Figure 4:
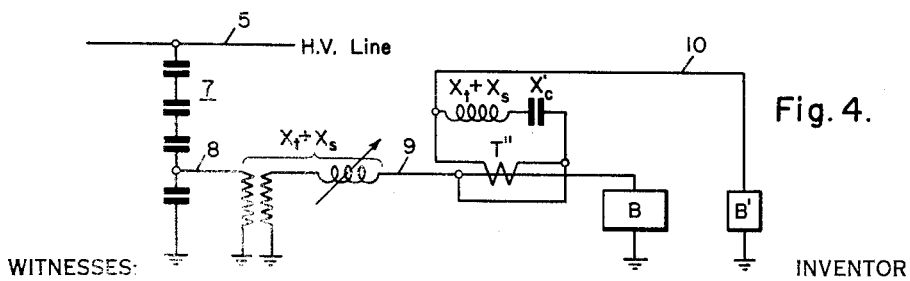
Fig. 4 is a diagram similar to Fig. 1, with another illustrative form of embodiment of my invention incorporated therein.

Fig. 4 shows an alternative arrangement, which is theoretically the same as that which is shown in Fig. 3. In Fig. 4, the auxiliary capacitance and the auxiliary inductance, as represented by the reactances $X'_c$ and $(X'_t + X'_s)$, are taken out of the main-burden circuit, and placed in the secondary circuit of a current-transformer T", the primary of which is placed in series with the secondary output-circuit 9 of the potential-device, so that the current for the main-burden passes through the primary of this current-transformer. The branch-circuit 10, which is tapped off from the secondary output-circuit 9, is connected so as to receive therein the voltage-drop through the impedances which are connected across the secondary circuit of the current-transformer T", the polarity of the transformer being such as to cause the compensating voltage which is introduced thereby, in the branch-circuit 10, to be equal and opposite to the voltage drop which is occasioned by the passage of the main-burden current through the equivalent impedances of the capacitor potential-device.

My transient correction-means, as above described, may be either built in, as a part of the potential-device as sold, or it may be sold, as a separate device, for mounting on a switchboard (not shown), so that it will require only the usual number of leads, represented by the secondary output-circuit 9, running from the potential-device to the switchboard.

My invention makes it possible to satisfactorily energize the potential-circuits of a directional relay, or other critical, phase-sensitive element, as represented by the small burden B', from a capacitor potential-device which is supplying practically all of its rated output to other burdens, as represented at B in Figs. 3 and 4. It is thus possible, with my device, to use a conventional type of directional relay or other critical element B'. My invention also makes it possible, since the phase-critical element B' is segregated from all of the other burdens B on the potential-device, to redesign the one element B' so that it will give good transient performance, even though the transient compensation of which I speak is not extremely accurate or perfect. This redesign of the single part or element B' is quite feasible, in many instances, whereas it would be out of the question to redesign all of the elements of the entire burden B which is supplied by the potential-device.

While I have illustrated my invention in only two alternative forms of embodiment, and while I have explained its method of operation in accordance with my present understanding thereof, I do not wish to be limited, either to the precise forms of embodiment, or to the precise details of the explanation. I desire, therefore, that the appended claim shall be accorded the broadest construction consistent with its language.

I claim as my invention:

A capacitor potential-device comprising a step-down potential-transformer having a primary input-circuit and a main secondary output-circuit, and means for adjusting the equivalent leakage-reactance of the step-down transformer whereby, when the primary input-circuit is connected to a high-voltage alternating-current line through a capacitance-divider, said equivalent leakage-reactance can be made substantially equal to the equivalent capacitive reactance of the source, characterized by series-circuit means for, in effect, connecting an auxiliary capacitance and an auxiliary inductance in series-circuit relation to said main secondary output-circuit, whereby to provide a main-burden circuit which draws its current, in effect, through said auxiliary capacitance and said auxiliary inductance, the ratio between the reactance of said auxiliary inductance and the equivalent leakage-reactance of the step-down transformer being substantially the same as the ratio between the reactance of said auxiliary capacitance and the equivalent capacitance reactance of said source, and branch-circuit means for, in effect, causing a compensating transformer to be connected in branch-circuit relation to said main secondary output-circuit, whereby to provide a small-burden circuit which is impressed with the voltage of said main secondary output-circuit minus a voltage of said compensating-transformer, said compensating transformer having a winding-portion connected across both said auxiliary capacitance and said auxiliary inductance, the voltage-ratio of said compensating transformer being substantially the same as the ratio between the equivalent capacitive reactance of said source and the reactance of said auxiliary capacitance.

EDWIN L. HARDER.

No references cited.